Apr. 24, 1923.
J. W. WEBB
DEVICE FOR TESTING FIBER BOARD
Filed Feb. 28, 1921
1,452,944
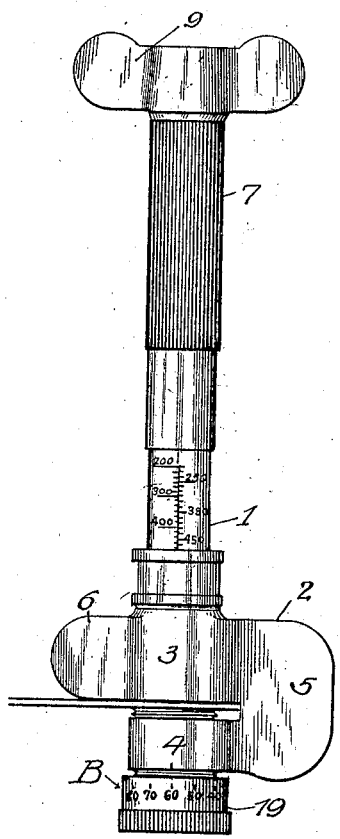
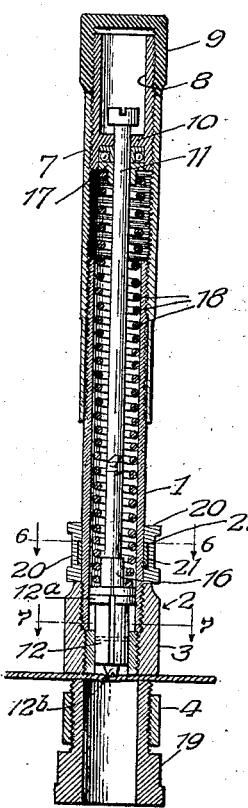
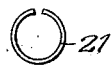
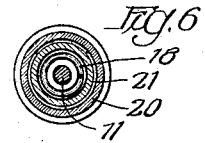
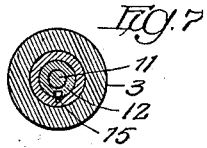
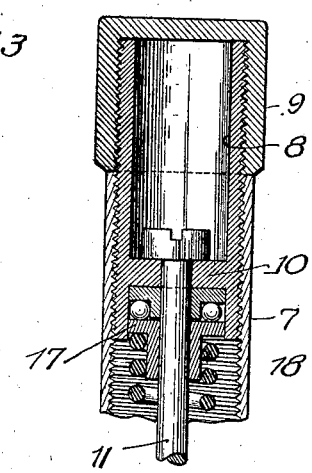
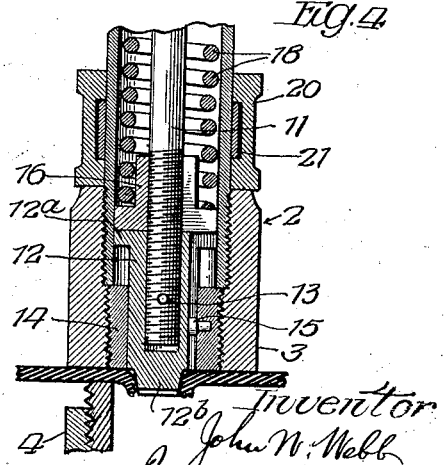

Patented Apr. 24, 1923.

1,452,944

UNITED STATES PATENT OFFICE.

JOHN W. WEBB, OF CHICAGO, ILLINOIS.

DEVICE FOR TESTING FIBER BOARD.

Application filed February 28, 1921. Serial No. 448,439.

*To all whom it may concern:*

Be it known that I, JOHN W. WEBB, a citizen of the United States, residing at Chicago, in the county of Cook and State of Illinois, have invented certain new and useful Improvements in Devices for Testing Fiber Board, of which the following is a specification.

My invention relates to a simple paper board testing device which in some respects may be regarded as an improvement upon the device disclosed in Patent No. 1,328,349, issued to Webb Tester, Incorporated, on January 20th, 1920, for improvements in devices for testing corrugated paper board and corrugated paper board boxes. The object of my invention is the provision of a portable pocket tool of somewhat similar design, more particularly adapted for measuring the bursting strength of relatively heavy fiber board and paste board or paper of substantial strength and thickness, and which will also measure the thickness of the board in adjusting the tool for making a test of its bursting strength. With the foregoing and incidental objects and advantages relating to the construction of the tool in view, I have invented the novel testing device shown in the accompanying drawings and hereinafter described with reference thereto in detail, the essential elements of my invention being more particularly pointed out in the appended claims.

Figure 1 of the drawing shows my novel testing device in elevation; Fig. 2 is a central longitudinal section of the same, the plane of the section being at a right angle to the position of the tool as shown in Fig. 1; Fig. 3 is an enlarged section corresponding to the upper portion of Fig. 2; Fig. 4 is an enlarged fragmentary section showing the construction of the plunger head and adjacent portions of the tool; Fig. 5 is a detail showing the split spring for yieldingly retaining the sliding indicating collar in position; and Figs. 6 and 7 are sections on the lines 6—6 and 7—7, respectively, of Fig. 2 looking in the direction of the arrow.

The same reference characters indicate the same parts in all the figures of the drawing.

As in the tool described in my patent above mentioned, my tool includes a base portion adapted to receive the sheet to be tested, and a shank secured thereto and housing a spring-pressed plunger adapted to be put under increasing tension by a rotatable sleeve until the stress of the spring (indicated by a scale on the shank) causes the plunger to burst through the paper. Proceeding to a description of the specific construction of my new tester, the shank 1 of the device is screw threaded, or secured in any suitable manner to a transversely slotted base block 2 which latter consists of aligned upper and lower tubular portions 3 and 4 separated by a slot arranged to receive the board to be tested, said portions being connected at one side by a wing 5 and the upper portion 3 of the block being also provided diametrically opposite the wing 5, with a wing 6 for convenience of manipulation in using the tool. The upper end of the shank 1 is threaded to engage the interiorly threaded central portion of an operating sleeve 7, the lower portion of which latter is bored smooth to slidingly engage the lower portion of the shank, the shank being provided with a scale A adapted to be read in connection with the lower end of the sleeve. This scale is graduated so as to give indications corresponding to those afforded by machines known in the art and which nominally express in pounds per square inch the pressure required to puncture or burst a sheet of paper or paper board. Inasmuch as the tool herein described is intended for testing paper board of substantial thickness and strength, the graduations begin with an indication of 200, that is, nominally, a bursting strength of two hundred pounds per square inch.

Slidingly arranged on the graduated portion of the shank 1 is an indicating collar 20 formed with an internal annular recess in which is arranged a split clasping spring 21 by means of which it is yieldingly and frictionally held in any position to which it may be set on the shank.

In the upper end of the sleeve 7 is arranged a threaded tubular connecting plug 8, the upper end of which extends above the top of the sleeve and carries a winged operating nut 9.

The plug 8 is formed with an orificed cross partition 10 slidingly engaged by the headed upper end of a stem 11 to the lower end of which latter is secured, in the present instance through screw threaded engagement a plunger head 12. This plunger head (see Fig. 4) is formed with a top flange 12ª slidingly engaging the inner wall of the shank 1 and a wedge-shaped die 12ᵇ, formed with two parallel ridges on its bearing face at the lower end of the central body, marked 12, and this central portion makes sliding, but non-rotatable engagement with a bushing 14 secured in the portions of the base block of the tool, a pin 15 secured to the bushing and engaging a longitudinal groove in the plunger block 12 being employed for the purpose in the present instance. The plunger head is arranged to seat solidly against and serve as a lock nut for a split thrust collar 16 which makes tight frictional screw threaded engagement with the stem 11, and intermediate this collar and a thrust collar 17 which bears against a ball-bearing support housed in the tubular connecting plug 8 below the partition 10 is arranged a helical compression spring 18 surrounding said stem. A cross pin 13 is employed for further security in holding the plunger head on the stem.

The portion 4 of the base block is threaded in axial alignment with the shank and plunger stem to receive a plug 19 which is milled around its base to enable it to be readily turned so as to clamp a sheet of the board to be tested between its annular upper face and the lower face of the portion 3 of the base block. This plug is recessed or orificed as shown to provide a cavity in alignment with the plunger die. The periphery of the plug is provided with a micrometer scale B arranged to be read in connection with an indicator line adjacent thereto on the base block, so as to give an indication expressed in thousandths of an inch of the thickness of a board clamped in the tool in readiness for a test of its bursting strength.

In assembling the parts, the operating sleeve 7 and connecting plug 8 are connected and the stem is inserted in the connecting plug, and the parts of the ball bearing, the spring and the retaining members at the lower end of the stem then assembled, the thrust collar being screwed upon the stem as near as may be to a point where the spring will be confined under a pressure somewhat below the stress required to give an indication of 200 pounds on the scale on the shank,—say a stress equivalent to an indication of 180. The operating sleeve is now screwed down upon the shank until the reading of the scale is 200 pounds, in which position, if the adjustment should chance to be correct the plunger top should be lifted somewhat above the partition 10 when the bottom of the plunger die is sustained at a level with the plane of the lower face of the base block part 3,—that is, the plane of the upper face of a piece of board clamped in position for a test,—see Fig. 2. By means of a suitable apparatus (which forms no part of this invention and therefore need not be described) the stress of the spring at this compression is now determined, and any needed adjustment of the operating sleeve up or down on the connecting plug to attain this relationship of the parts may be made by turning the sleeve with reference to the barrel in the proper direction and to the required extent, the pitch of the threaded connection and its effect upon the adjustment being known. When the exact adjustment of the graduation is attained the operating nut is seated as tightly as possible against the operating sleeve on the connecting plug to secure the parts against change. The high initial tension of the spring enables the plunger die to be lifted out of engagement with the material being tested after the completion of a test and shortly after the operating sleeve has been unscrewed past the 200 pounds indication, which would not be possible were the initial tension low.

The manner in which my novel testing device is used requires but brief explanation. The operating sleeve is unscrewed to lift the die high enough to clear the opening below the base block member 3—if it was not left in such position at the close of a previous test,—and the board to be tested inserted in such opening and clamped in place, the micrometer scale giving an indication of its thickness. The operating handle or nut is then turned, compressing the spring until its stress causes it to burst through the board, and giving an indication on the scale A. The collar 20 may have been arranged in contact with the lower end of the operating sleeve before beginning to screw the nut and sleeve down, in which case its upper edge will retain the indication after the sleeve has been screwed upwardly again, or such nut may be lifted into contact with the sleeve from lowermost position after the die has broken through the board and before unscrewing the sleeve and the clamping plug 19 to disengage the material, if for any reason it should be more convenient to remove the tester from the board for subsequent reading than read it at once from the edge of the sleeve.

I claim:

1. A testing device of the character described and comprising a shank, a transversely slotted base block, a spring-stressed plunger slidingly mounted in said shank and provided with means for indicating the stress of the spring, and a recessed clamping plug in alignment with said plunger, said plug being provided with a scale indicating the distance between the opposed clamping faces.

2. A testing device of the character described and comprising a shank, a transversely slotted base block, a spring-stressed plunger slidingly mounted in said shank and provided with means for indicating the stress of the spring, and a recessed clamping plug in alignment with said plunger, said clamping plug being screw-threaded and provided with a micrometer scale.

3. A testing device of the character described and comprising a shank, a transversely slotted base block, a plunger member slidingly mounted in said shank and equipped with a plunger point, a spiral compression spring arranged to bear against said plunger member, an operating sleeve having screw threaded connection with said shank and arranged to cooperate with said spring, said base block and operating sleeve both being provided with winged manipulating members.

4. A testing device of the character described and comprising a base member arranged to support the board to be tested, a shank, an operating sleeve having screw threaded connection with said shank, said shank and sleeve being one or the other marked with a scale of graduation indicating their relative movement, a connecting plug secured to said sleeve and longitudinally adjustable with respect thereto, a plunger member having a headed stem slidingly engaging said connecting plug and at its lower end provided with a thrust collar, and a spiral compression spring compressed to a relatively high initial tension between said connecting plug and thrust collar.

5. A testing device according to claim 4 in which said connecting plug is a tubular externally screw-threaded member making threaded engagement with said operating sleeve and in which a winged lock nut is arranged to secure said sleeve and plug together in adjusted relation.

6. A testing device according to claim 4 in which said shank is threaded above said graduations and the lower part of said operating sleeve is cylindrical and slidingly engages the graduated portion of said shank.

7. A testing device according to claim 4 in which said operating sleeve is formed with a smooth cylindrical interior at its lower portion and a threaded interior above said smooth portion, the lower end of said threaded portion being arranged to cooperate with said shank and the upper end arranged to engage said connecting plug.

JOHN W. WEBB.